(12) United States Patent
Saito (10) Patent No.: US 9,510,576 B2
(45) Date of Patent: Dec. 6, 2016

(54) SPINNING REEL (71) Applicant: Shimano Inc., Sakai, Osaka (JP)

(72) Inventor: Kei Saito, Osaka (JP)

(73) Assignee: Shimano Inc., Osaka (JP)

(*) Notice: Subject to any disclaimer, the term of this patent is extended or adjusted under 35 U.S.C. 154(b) by 175 days.

(21) Appl. No.: 14/520,709

(22) Filed: Oct. 22, 2014

(65) Prior Publication Data

US 2015/0136889 A1    May 21, 2015

(30) Foreign Application Priority Data

Nov. 19, 2013   (JP) ................................ 2013-238561

(51) Int. Cl.
*A01K 89/01*   (2006.01)
*A01K 89/015*   (2006.01)
*A01K 89/033*   (2006.01)

(52) U.S. Cl.
CPC .......... *A01K 89/015* (2013.01); *A01K 89/0111* (2013.01); *A01K 89/033* (2013.01)

(58) Field of Classification Search
CPC ............. A01K 89/01; A01K 89/0111; A01K 89/011221; A01K 89/01928
See application file for complete search history.

(56) References Cited

U.S. PATENT DOCUMENTS

| 6,149,089 | A  | * | 11/2000 | Matsuda | A01K 89/01 242/246 |
|---|---|---|---|---|---|
| 6,457,662 | B1 | * | 10/2002 | Sato | A01K 89/01 242/247 |
| 2002/0117570 | A1 | * | 8/2002 | Kitajima | A01K 89/0111 242/322 |
| 2003/0111569 | A1 | * | 6/2003 | Hitomi | A01K 89/00 242/321 |
| 2005/0145735 | A1 | * | 7/2005 | Ikuta | A01K 89/01 242/307 |
| 2006/0231657 | A1 | * | 10/2006 | Morise | A01K 89/027 242/244 |
| 2008/0149750 | A1 | * | 6/2008 | Kitajima | A01K 89/01 242/224 |
| 2009/0272831 | A1 | * | 11/2009 | Matsuo | A01K 89/0111 242/322 |
| 2011/0042500 | A1 | * | 2/2011 | Saito | A01K 89/01 242/224 |
| 2011/0180646 | A1 | * | 7/2011 | Hiraoka | A01K 89/006 242/241 |

FOREIGN PATENT DOCUMENTS

JP       2002-204640 A       7/2002

* cited by examiner

Primary Examiner — Emmanuel M Marcelo
(74) Attorney, Agent, or Firm — Global IP Counselors (57) ABSTRACT

The present spinning reel includes a reel body unit, a spool shaft, a spool, a drag mechanism, and a seal member. The spool includes a line winding cylinder part and a front flange. The drag mechanism includes a spool braking unit and a drag adjuster. The seal member is elastically deformable. The seal member protrudes from the drag adjuster side toward the front flange so as to close a space that is formed between the front flange and the drag adjuster. The seal member is configured to abut the front flange disposed on the front side of the line winding cylinder part.

8 Claims, 4 Drawing Sheets

SPINNING REEL

CROSS-REFERENCE TO RELATED APPLICATIONS

This application claims priority to Japanese Patent Application No. 2013-238561 filed on Nov. 19, 2013, the entirety of which is hereby incorporated by reference in its entirety.

BACKGROUND OF THE INVENTION

Field of the Invention

The present invention relates to a spinning reel that forwardly casting a fishing line.

Background Art

A conventional spinning reel comprises a reel body unit, a spool shaft, a spool, a drag mechanism, and a seal member (refer to Japanese Laid-Open Patent Publication No. 2002-204640). In this conventional spinning reel, the spool shaft is supported by the reel body unit so as to be movable in a longitudinal direction. The spool is attached to the spool shaft. The spool comprises a line winding cylinder part and a flange that is on the front side and the rear side of the line winding cylinder part. The drag mechanism brakes a rotation of the spool and is housed inside of the spool. The drag mechanism comprises a braking member that brakes the rotation of the spool and a drag adjuster that is attached to the distal end of the spool shaft and that adjusts the frictional coupling force of the braking member. The seal member is disposed inside of the line winding cylinder part of the spool between the drag adjuster and the braking member. Intrusion of foreign matter into the braking member of the drag mechanism from the front of the spinning reel is prevented by abutting the distal end portion of this seal member to the inner peripheral surface of the line winding cylinder part (more accurately, the inner peripheral surface of the flange fixing member).

SUMMARY

In the conventional spinning reel, the distal end portion of the seal member abuts the inner peripheral surface of the line winding cylinder part of the spool in order to prevent the intrusion of foreign matter into the braking member of the drag mechanism from the front of the spinning reel. In this configuration, to abut the distal end portion of the seal member to the inner peripheral surface of the line winding cylinder part, it is necessary that the entirety of the reel member from the proximal end portion to the distal end portion be disposed inside of the line winding cylinder part. That is, a space for disposing the entire seal member inside of the line winding cylinder part needs to be secured inside of the line winding cylinder part. For this reason, the outer diameter of the line winding cylinder part of the spool is large, so that it is possible that a sufficient amount of line winding could not be accomplished.

Furthermore, in the conventional configuration, only the distal end portion of the seal member abuts the inner peripheral surface of the line winding cylinder part of the spool. That is, the distal end portion of the seal member is in line contact with the inner peripheral surface of the line winding cylinder part in the circumferential direction. Therefore, when foreign matter intrudes from the front of the seal member, depending on the pressing force of the foreign matter with respect to the seal member, there is the risk that the foreign matter could intrude to the inside of the line winding cylinder part.

The present invention is made in light of the above-described problems, and the object of the present invention is to provide a spinning reel that can sufficiently wind fishing line to a spool. Another object of the present invention is to provide a spinning reel that can reliably prevent the intrusion of foreign matter inside of the spool.

The spinning reel according to a first aspect is a spinning reel that forwardly casts a fishing line. The present spinning reel comprises a reel body unit, a spool shaft, a spool, a drag mechanism, and a seal member. The spool shaft is supported by the reel body unit to be movable in the longitudinal direction. The spool is attached to the spool shaft. The spool comprises a line winding cylinder part and a flange. A fishing line is wound to the outside of the line winding cylinder part. A front flange is disposed on the front side of the line winding cylinder part.

The drag mechanism comprises a braking member and a drag adjuster. The braking member is housed inside of the spool and brakes the rotation of the spool. The drag adjuster is attached to the distal end of the spool shaft and adjusts the frictional coupling force of the braking member. The seal member is elastically deformable. The seal member protrudes from the drag adjuster side toward the front flange so as to seal a space that is formed between the front flange and the drag adjuster. The seal member can abut the front flange disposed on the front side of the line winding cylinder part.

In the present spinning reel, the space that is formed between de front flange and the drag adjuster is closed with the seal member abutting the front flange. Accordingly, in the present spinning reel, the seal member abuts the front flange; therefore, it is not necessary to secure a space for disposing the entire seal member inside of the line winding cylinder part of the spool. Therefore, when compared to conventional technology, the outer diameter of the line winding cylinder part of the spool can be small, and sufficient fishing line can be wound around the spool. That is, it is possible to provide a spinning reel that can sufficiently wind fishing line to the spool.

The spinning reel according to a second aspect comprises the spinning reel recited in the first aspect, with the front flange comprising a flange portion that extends in a direction away from the spool shaft and a connecting portion that connects the line winding cylinder part and the flange portion. At least one of the flange portion and the connecting portion comprises a projection. The distal end portion of the seal member can abut the projection.

In this configuration, since the distal end portion of the seal member can abut the projection of at least one of the flange portion and the connecting portion, the intrusion of foreign matter inside of the spool can be more reliably prevented.

The spinning reel according to a third aspect comprises the spinning reel recited in the second aspect, with the projection protruding forward from at least one of the flange portion and the connecting portion.

In this configuration, since the distal end portion of the seal member can abut a projection that protrudes forward from at least one of the flange portion and the connecting portion, the intrusion of foreign matter along the flange portion and/or the connecting portion can be more reliably prevented.

The spinning reel according to a fourth aspect comprises the spinning reel recited in the third aspect, with the distal end portion of the projection being bent toward the spool shaft.

In this configuration, the distal end portion of the seal member can be disposed between the part where the distal end portion of the projection is bent and at least one of the flange portion and the connecting portion, on that the distal end portion of the seal member can be covered by the projection. Accordingly, the distal end portion of the seal member can be protected, and the intrusion of foreign matter along the flange portion and/or the connecting portion can be more reliably prevented.

The spinning reel according to a fifth aspect comprises the spinning reel recited in any one of the first to the fourth aspects, with the distal end side rear surface of the seal member abutting the front flange.

In this configuration, the distal end side rear surface of the seal member can be in surface contact with the front flange. Accordingly, the seal member can reliably prevent the intrusion of foreign matter. That is, a spinning reel that can reliably prevent the intrusion of foreign matter inside of the spool can be provided.

The spinning reel according to a sixth aspect comprises the spinning reel recited in the fifth aspect, with the front flange comprising a flange portion and a connecting portion. The flange portion is a portion that extends in a direction away from the spool shaft. The connecting portion is a portion that connects the line winding cylinder part and the flange portion. The connecting portion comprises an abutting plane that can abut the distal end side rear surface of the seal member.

In this configuration, the distal end side rear surface of the seal member can be in surface contact with the abutting plane of the connecting portion. Accordingly, the seal member can reliably prevent the intrusion of foreign matter.

The spinning reel according to a seventh aspect comprises the spinning reel recited in any one of the first to the sixth aspects, with the drag adjuster comprising an adjustment knob, an abutting member, and a fixing member. The adjustment knob is screwed to the distal end of the spool shaft. The abutting member is disposed on the adjustment knob and can abut the front surface of the seal member. The fixing member fixes the abutting member to the adjustment knob.

In this configuration, the intrusion of foreign matter inside of the drag adjuster can be prevented by abutting the abutting member of the drag adjuster to the front surface of the seal member.

The spinning reel according to an eighth aspect comprises the spinning reel recited in the seventh aspect, with the fixing member comprising a threaded portion and a head portion. The adjustment knob comprises a boss portion to which the threaded portion is screwed. The abutting member comprises a holding portion into which the boss portion is inserted and that is held by the adjustment knob and the head portion.

In this configuration, a boss portion of the adjustment knob is inserted into the holding portion of the abutting member. In this state, the holding portion of the abutting member is held by the adjustment knob and the head portion. Accordingly, since the threaded portion of the fixing member can be screwed to the boss portion of the adjustment knob on the head portion side, the boss portion of the adjustment knob can be short. That is, it is possible to reduce the size of the drag adjuster, and the seal member can abut at least one of the front flange and the connecting portion.

The spinning reel according to a ninth aspect comprises the spinning reel recited in the eighth aspect, with the boss portion comprising a body section and a large-diameter section that is disposed on the outer periphery of the body section. The holding portion is held by the head portion and the large-diameter section.

In this configuration, the holding portion of the abutting member is held by the head portion of the fixing member and the large-diameter section of the boss portion of the adjustment knob, so that the abutting member can be securely fixed to the adjustment knob by the fixing member.

According to the present invention, a spinning reel that can sufficiently wind fishing line to a spool is provided. Additionally, according to the present invention, a spinning reel that can reliably prevent the intrusion of foreign matter inside of the spool is provided.

BRIEF DESCRIPTION OF THE DRAWINGS

Referring now to the attached drawings which form a part of this original disclosure.

DETAILED DESCRIPTION OF THE EMBODIMENTS

First Embodiment

Figure 1:
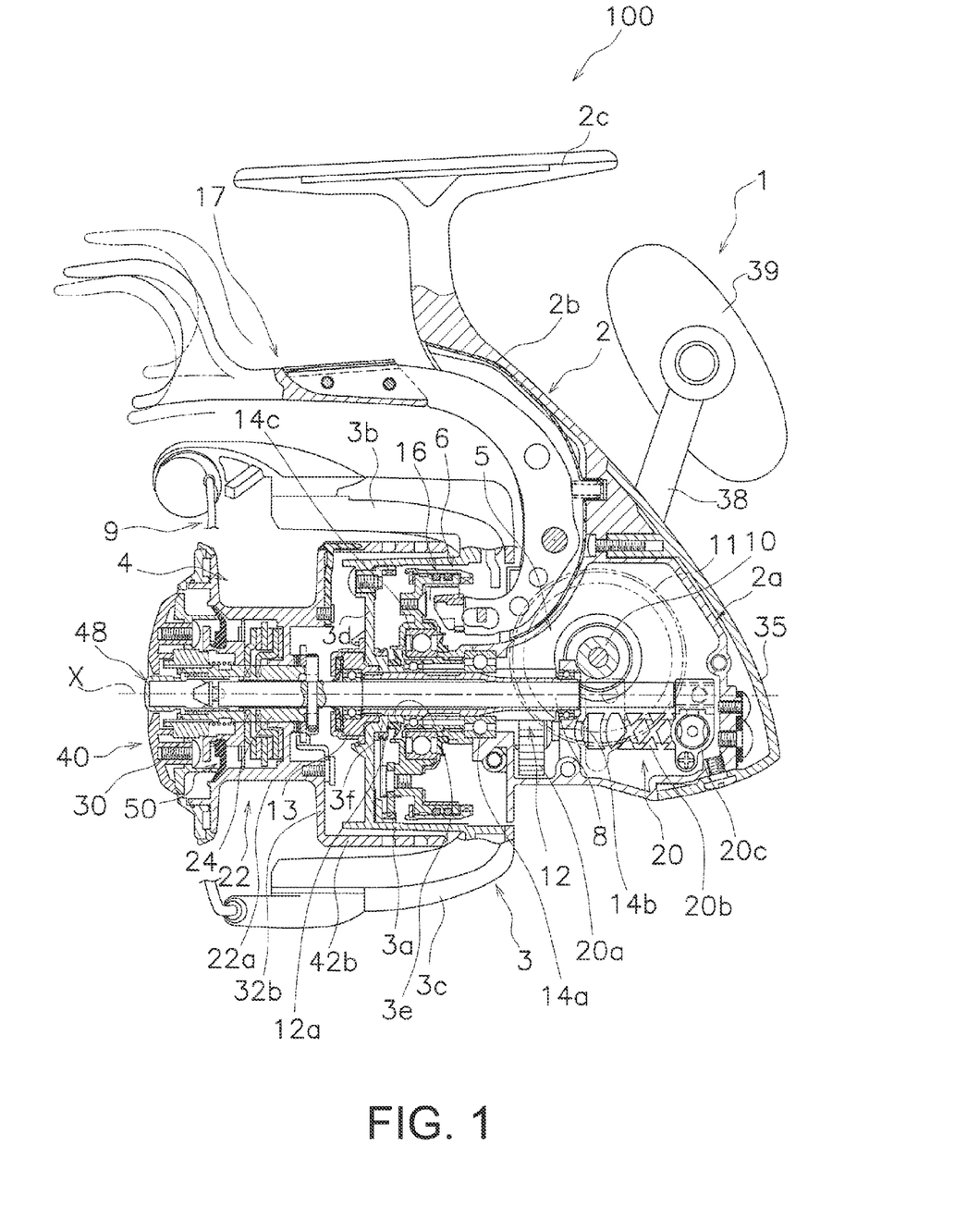
FIG. 1 is a lateral cross-sectional view of a spinning reel according to a first embodiment of the present invention.

As shown in FIG. 1, a spinning reel 100 according to the first embodiment is a lever brake-type reel configured to forwardly unreel fishing line. The spinning reel 100 mainly comprises a handle 1, a reel body unit 2 that rotatably supports the handle 1, a rotor 3, a spool 4, a drag mechanism 30, and a seal member 50.

The handle 1 is rotatably mounted to the reel body unit 2. The handle 1 comprises a handle arm 38 that can be folded and a handle grip 39 that is rotatably mounted to the distal end of the handle arm 38. The handle 1 is attached to a master gear shaft 10, which is a rotating shaft.

As shown in FIG. 1, the reel body unit 2 comprises a longitudinal rod mounting portion 2c that is mounted to a fishing rod, a reel body 2a that is disposed to be spaced apart from the rod mounting portion 2c, and a leg portion 2b that couples the rod mounting portion 2c and the reel body 2a. The reel body 2a comprises a mechanism mounting space inside. The reel body 2a is integrally formed with the leg portion 2b, and the side is open. The opening of the reel body 2a is closed by a lid member (not shown). The rear portion of the reel body unit 2 is covered by a guard member 35.

As shown in FIG. 1, a rotor drive mechanism 5, a lever brake mechanism 6, and an oscillating mechanism 20 are disposed inside of the reel body 2a.

The rotor drive mechanism 5 is a mechanism for rotating the rotor 3 in conjunction with the handle 1. As shown in FIG. 1, the rotor drive mechanism 5 comprises a master gear shaft 10 to which the handle 1 is fixed so as to be integrally rotatable therewith, a master gear 11 that rotates along with the master gear shaft 10, and a pinion gear 12 that meshes with the master gear 11.

The master gear shaft 10 is formed integrally with the master gear 11 and has a tubular shape. The master gear shaft 10 is rotatably supported by both the reel body 2a and the lid member (not shown).

The master gear 11 rotates along with the master gear shaft 10. The master gear 11 is integrally formed with the master gear shaft 10. However, the master gear 11 can be separate from the master gear shaft 10.

As shown in FIG. 1, the pinion gear 12 is a member that meshes with the master gear 11. The pinion gear 12 is formed in a tubular shape. The front portion 12a of the pinion gear 12 extends to the spool 4 side through a through-hole 3e of the rotor 3. The front portion 12a of the pinion gear 12 is also fixed to the rotor 3 via a out 13. That is, the rotor 3 is integrally and rotatably fixed to the pinion gear 12 by the nut 13 in the front portion 12a of the pinion gear 12.

Additionally, the center portion and the rear end portion in the axial direction of the pinion gear 12 are both rotatably supported by the reel body unit 2, for example, by the reel body 2a, via axle bearings 14a and 14b, respectively. The pinion gear 12 is also rotatably supported in the distal end portion by the axle bearing 14c.

The lever brake mechanism 6 is a mechanism for braking the rotation of the rotor 3 in the line delivering direction (the reverse rotation). That is the lever brake mechanism 6 is a rotor braking device. As shown in FIG. 1, the lever brake mechanism 6 comprises a rotor brake unit 16, as well as a brake lever 17 for adjusting the braking force of the rotor brake unit 16. The rotor brake unit 16 is disposed on the inner peripheral part of the rotor 3 and brakes the rotor 3. The brake lever 17 can switch the state of the rotor brake unit 16 between a prescribed braking state in which the rotor brake unit 16 brakes the rotor 3 and a brake release state in which the braking of the rotor brake unit 16 is released.

The oscillating mechanism 20 operates in conjunction with the rotation of the handle 1 and reciprocally moves the spool 4 back and forth via the spool shaft 8. As shown in FIG. 1, the oscillating mechanism 20 is a traverse cam type that comprises an intermediate gear 20a, a traverse camshaft 20b, and a slider 20c. The traverse camshaft 20b is mounted to the reel body 2a to be rotatable around an axis that is parallel to the spool shaft 8. The slider 20c moves along the traverse camshaft 20b the longitudinal direction with the rotation of the traverse camshaft 20b. The rear end of the spool shaft 8 is non-rotatably fixed to the slider 20c. The intermediate gear 20a is fixed to the distal end of the traverse camshaft 20b. The intermediate gear 20a meshes with the pinion gear 12.

The rotor 3 is rotatably supported by the reel body unit 2. As shown in FIG. 1, the rotor 3 comprises a cylindrical portion 3a, as well as a first arm portion 3b and a second arm portion 3c that are disposed on the sides of the cylindrical portion 3a facing each other. A boss portion 3f having a through-hole 3e is formed in the center portion of the front wall 3d of the cylindrical portion 3a. The spool shaft 8 and the pinion gear 12 extend through this through-hole 3e. The rotor brake unit 16 is disposed in the inner peripheral part of the cylindrical portion 3a. When the brake lever 17 of the lever brake mechanism 6 is operated, the cylindrical portion 3a (the rotor 3) is braked via the rotor brake unit 16. A bail arm 9 is pivotally disposed on the distal end of the first arm portion 3b and the distal end of the second arm portion 3c. The fishing line is guided to the spool 4 by the bail arm 9.

As shown in FIG. 1, the spool 4 is disposed so as to be movable back and forth in the front portion of the rotor 3. The spool 4 is disposed between the first arm portion 3b and the second arm portion 3c of the rotor 3. The spool 4 is detachably mounted to the distal end of the spool shaft 8.

Figure 2:
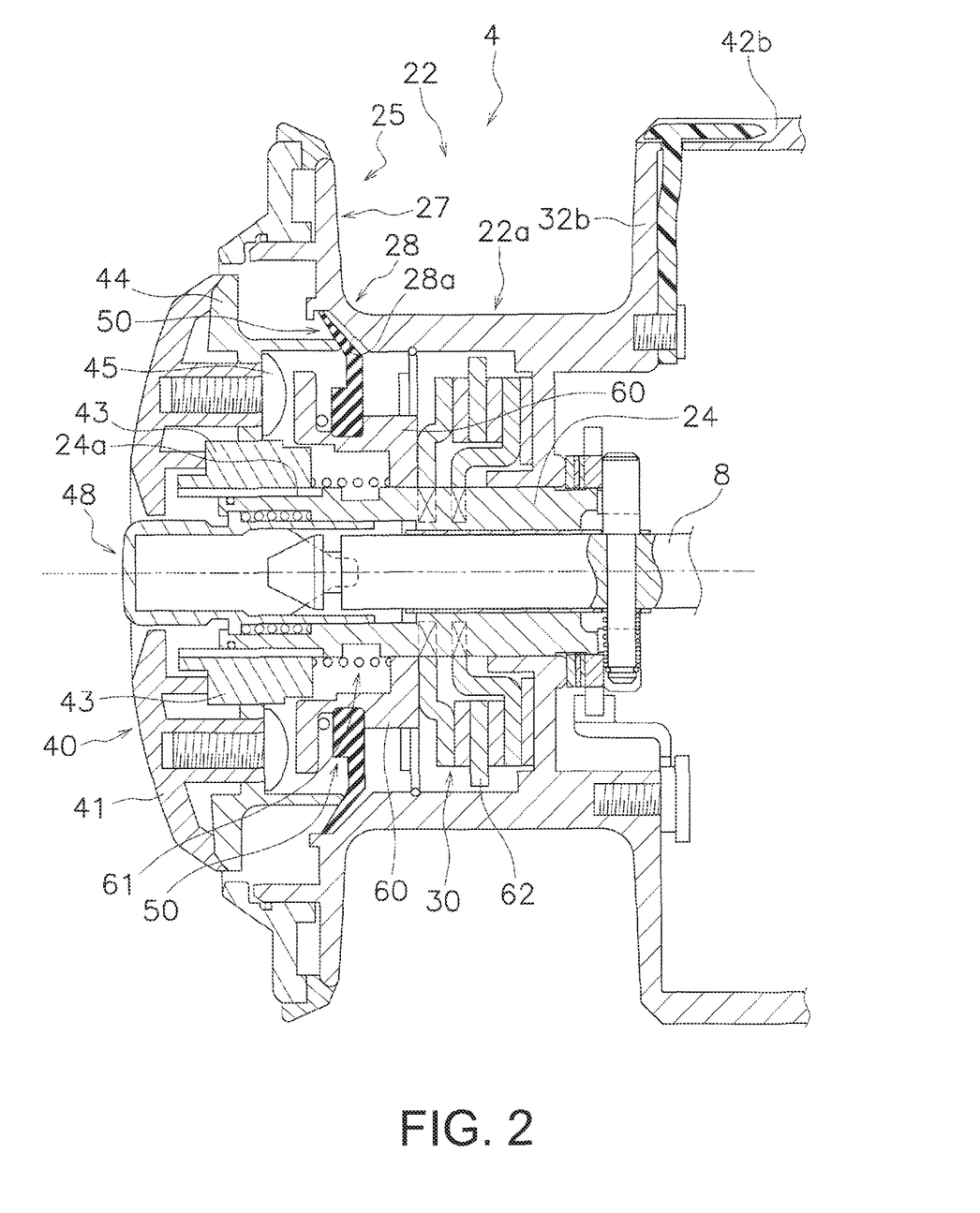
FIG. 2 is a partial enlarged cross-sectional view of FIG. 1.

As shown in FIG. 2, the spool 4 comprises a spool body 22 and a spool tube part 24. The spool body 22 comprises a line winding cylinder part 22a, a front flange 25, a rear flange 32b, and a tubular portion 42h. The line winding cylinder part 22a is formed in a tubular shape. Fishing line is wound to the outer peripheral surface of the line winding cylinder part 22a.

The front flange 25 is disposed on the front side of the line winding cylinder part 22a. The front flange 25 extends radially outward from the front end portion of the line winding cylinder part 22a. The front flange 25 comprises a flange portion 27 and a connecting portion 28. The flange portion 27 is a portion that extends in a direction away from the spool shaft 8. The flange portion 27 is formed in an essentially annular shape.

As shown in FIG. 2, the connecting portion 28 is a portion that connects the line winding cylinder part 22a and the flange portion 27. The connecting portion 28 is integrally formed with the line winding cylinder part 22a and the flange portion 27. The connecting portion 28 comprises an abutting plane 28a. The abutting plane 28a can abut the distal end side rear surface of the seal member 50, for example, the rear surface of an inclined portion 52b, as mentioned below. The abutting plane 28a is formed on the inner peripheral side of the connecting portion 28. The abutting plane 28a is formed in the circumferential direction on the inner peripheral surface of the connecting portion 28. Additionally, the abutting plane 28a is inclined from the front surface of the flange portion 27 toward the inner peripheral surface of the line winding cylinder part 22a.

At least one of the flange portion 27 and the connecting portion 28 comprises a projection 29. In one embodiment, the projection 29 is formed in the flange portion 27. The projection 29 protrudes forward from the flange portion 27 and is formed in an annular shape in the circumferential direction. A bent portion 29a that is bent toward the spool shaft 8 is formed in the distal end portion of the projection 29. The bent portion 29a is integrally formed with the projection 29 in an annular shape in the distal end portion of the projection 29.

As shown in FIG. 2, the rear flange 32b is disposed on the rear end portion of the line winding cylinder part 22a. Additionally, the rear flange 32b extends radially outward from the rear end portion of the line winding cylinder part 22a. The tubular portion 42h is a portion that extends rearward from the outer peripheral part of the rear flange 32b. The tubular portion 42b has a larger in diameter than the line winding cylinder part 22a. The tubular portion 42b is integrally formed with the rear flange 32b so as to cover the cylindrical portion 3a of the rotor 3.

As shown in FIG. 2, the spool tube part 24 is non-rotatably and detachably mounted to the spool shaft 8. The spool tube part 24 is able to detach the spool body 22 and the drag mechanism 30 from the spool shaft 8.

As shown in FIG. 2, the drag mechanism 30 brakes the rotation of the spool 4. The drag mechanism 30 comprises a drag adjuster 40 that is mounted to the distal end of the spool shaft 8, a pressing member 60 that is pressed by the drag adjuster 40, and a spool brake unit 62 (one example of a braking member) that is pressed by the pressing member 60 and brakes the spool 4.

Figure 3:
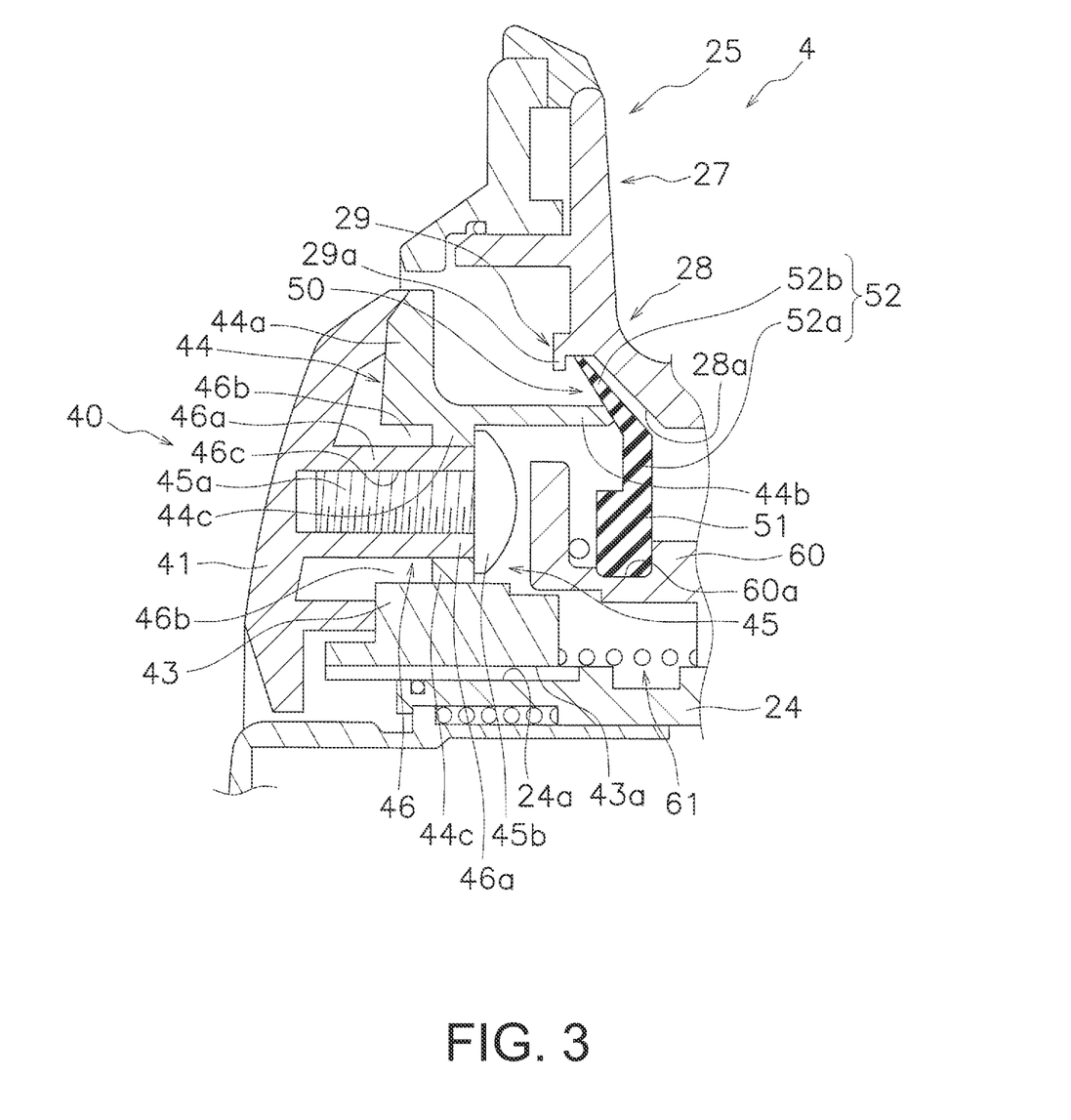
FIG. 3 is a partial enlarged cross-sectional view of FIG. 2.

As shown in FIG. 3, the drag adjuster 40 comprises an adjustment knob 41, a nut 43, an abutting member 44, and a fixing member 45. The adjustment knob 41 is for adjusting the frictional coupling force of the spool braking unit 62. The adjustment knob 41 is mounted on the distal end portion of the spool shaft 8. In particular, the adjustment knob 41 is mounted on the spool tube part 24 via the nut 43. For example, the adjustment knob 41 is mounted on the nut 43 in order to be relatively non-rotatable and can move in the axial direction along the spool tube part 24 along with the nut 43. Also, as discussed above, the spool tube part 24 is non-rotatably and detachably mounted to the distal end portion of the spool shaft 8. Thus, the adjustment knob 41 is detachable from the distal end portion of the spool shaft 8 via the nut 43 and the spool tube part 24.

The adjustment knob 41 comprises a boss portion 46. A threaded portion 45a (as mentioned below) of the fixing member 45 is screwed to the boss portion 46. In particular, the boss portion 46 comprises a boss body section 46a and a large-diameter section 46b that is provided to the outer periphery of the boss body portion 46a. The boss body section 46a is formed in an essentially tubular shape. A female threaded part 46c is formed in the inner peripheral part of the boss body section 46a. A threaded portion 45a (the male threaded portion) of the fixing member 45 is screwed into this female threaded part 46c.

The nut 43 is mounted to the adjustment knob 41 in order to be relatively non-rotatable and relatively movable in the axial direction. The female threaded part 43a is formed on the inner peripheral surface of the nut 43, and this female threaded part 43a is screwed to the male threaded portion 24a of the spool tube part 24. Accordingly, when the adjustment knob 41 is rotated, the nut 43 rotates along with the adjustment knob 41 and moves along the spool tube part 24.

The abutting member 44 is disposed on the adjustment knob 41 and can abut the front surface of the seal member 50. The abutting member 44 comprises a body portion 44a, an abutting portion 44b, and a holding portion 44c. The abutting portion 44b is integrally formed with the body portion 44a. The abutting portion 44b protrudes outward from the body portion 44a in a cylindrical shape. The distal end of the abutting portion 44b can abut the distal end side front surface of the seal member 50, for example, the front surface of an inclined portion 52b, mentioned below. The boss portion 46 of the adjustment knob 41 is inserted into the holding portion 44c. The holding portion 44c is held by the adjustment knob 41 and the fixing member 45. In particular, the holding portion 44c is held by the large-diameter section 46b of the adjustment knob 41 and the head portion 45b (as mentioned below) of the fixing member 45.

The fixing member 45 is a member for fixing the abutting member 44 to the adjustment knob 41. The fixing member 45 comprises a threaded portion 45a and a head portion 45b. For example, the threaded portion 45a is a male threaded portion. The head portion 45b is formed to be larger in diameter than the threaded portion 45a.

The pressing member 60 is disposed between the drag adjuster 40 of the drag mechanism 30 and the spool braking unit 62 of the drag mechanism 30. The pressing member 60 is pressed by the drag adjuster 40 via a spring member 61. Specifically, as described above, when the adjustment knob 41 rotates, the nut 43 rotates along with the adjustment knob 41 and moves along the spool tube part 24. Then, the spring member 61 is pressed by the nut 43, and the pressing member 60 is pressed by this spring member 61. Next, the pressing member 60 moves along the spool tube part 24, and the spool braking unit 62 is pressed.

The pressing member 60 also functions as a member for supporting the seal member 50. An annular groove 60a is formed on the outer peripheral part of the pressing member 60, and the seal member 50 is disposed in the annular groove 60a. Therefore, when the adjustment knob 41 is rotated and the pressing member 60 moves along the spool tube part 24, the seal member 50 also moves along the spool tube part 24 along with the pressing member 60.

As shown in FIG. 2, the spool braking unit 62 is housed inside of the spool 4 and brakes the rotation of the spool 4. The spool braking unit 62 is configured by a plurality of friction members. When the adjustment knob 41 is operated, the frictional coupling force of the plurality of friction members is adjusted, and the braking force with respect to the rotation of the spool 4 is adjusted. Specifically, when the adjustment knob 41 is rotated in a first direction, the frictional coupling force of the plurality of friction members increases, and the braking force during the rotation of the spool 4 increases. Meanwhile, when the adjustment knob 41 is rotated in a second direction, which is the opposite of the first direction, the frictional coupling force of the plurality of friction members decreases, and the braking force during the rotation of the spool 4 decreases. Accordingly, the braking force during the rotation of the spool 4 is adjusted.

As shown in FIG. 2 and FIG. 3, the seal member 50 is mounted to the spool tube part 24. Specifically, the seal member 50 is mounted to the spool tube part 24 via the pressing member 60 of the drag mechanism 30. That is, the seal member 50 is mounted to the spool shaft 8 via the pressing member 60 and the spool tube part 24.

The seal member 50 is elastically deformable. The seal member 50 protrudes from the drag adjuster 40 side toward the spool side so as to close a space that is formed between the spool 4 and the drag adjuster 40. The seal member 50 can abut the front flange 25. For example, in one embodiment, the seal member 50 abuts the projection 29 of the front flange 25. Additionally, the seal member 50 can abut the drag adjuster 40. For example, in one embodiment, the seal member 50 can abut the abutting member 44 of the drag adjuster 40.

Specifically, as shown in FIG. 3, the seal member 50 comprises a mounting portion 51 and a seal portion 52 that extend outward from the mounting portion 51. The mounting portion 51 is formed in a cylindrical shape. The inner peripheral part of the mounting portion 51 is mounted to the outer peripheral part of the pressing member 60. For example, in one embodiment, the inner peripheral part of the mounting portion 51 is mounted to the annular groove 60a of the pressing member 60.

The seal portion 52 is integrally formed on the outer peripheral part of the mounting portion 51. The seal portion 52 is formed in an essentially annular plate shape. The distal end portion of the seal member 50 abuts the projection 29 of the front flange 25. The distal end side rear surface of the seal member 50 abuts the front flange 25. The distal end side front surface of the seal member 50 also abuts the abutting member 44.

Specifically, the seal member 52 comprises a proximal end portion 52a and an inclined portion 52b. The proximal end portion 52a is a portion that extends radially outward (in a direction away from the spool shaft) from the mounting portion 51. The inclined portion 52b is a portion that extends while inclining forward from the proximal end portion 52a. In one embodiment, the distal end of the inclined portion 52b abuts the projection 29 that is formed in the flange portion 27 of the front flange 25. Additionally, the distal end of the inclined portion 52b is disposed between the bent portion 29a of the projection 29 and the front flange 25 in a direction along the spool shaft 8. The front surface of the inclined portion 52b also abuts the abutting portion 44b of the abutting member 44.

Additionally, a prescribed gap is formed between the rear surface of the inclined portion 52b and the abutting plane 28a of the connecting portion 28. In FIG. 2 and FIG. 3, the prescribed gap is formed between the rear surface of the inclined portion 52b and the abutting plane 28a of the connecting portion 28; however, the rear surface of the inclined portion 52b can abut the abutting plane 28a of the connecting portion 28 of the front flange 25. For example, when the drag adjuster 40 is operated and the drag adjuster 40 approaches the spool 4, the rear surface of the inclined portion 52b abuts the abutting plane 28a of the connecting portion 28 of the front flange 25. However, when the drag adjuster 40 is disposed in a state in which the above-described gap has been formed, and an external force acts on the front surface of the inclined portion 52b, the inclined portion 52b is elastically deformed toward the front side flange and is able to abut the abutting plane 28a of the connecting portion 28 of the front flange 25. Accordingly, the intrusion of foreign matter inside of the line winding cylinder part 22a can be reliably prevented. Furthermore, the front surface of the inclined portion 52b of the seal member 52 abuts the abutting member 44 (the abutting portion 44b) of the drag adjuster 40, so that the intrusion of foreign matter inside of the drag adjuster 40 is also prevented.

SUMMARY (A) The present spinning reel 100 is a reel that forwardly unreels fishing line. The present spinning reel 100 comprises a reel body unit 2, a spool shaft 8, a spool 4, a drag mechanism 30, and a seal member 50. The spool shaft 8 is supported by the reel body unit 2 so as to be movable longitudinally. The spool 4 is attached to the spool shaft 8. The spool 4 comprises a line winding cylinder part 22a and a front flange 25. Fishing line can be wound to the outside of the line winding cylinder part 22a. The front flange 25 is disposed on the front side of the line winding cylinder part 22a.

The drag mechanism 30 comprises a spool braking unit 62 and a drag adjuster 40. The spool braking unit 62 is housed inside of the spool 4 and brakes the rotation of the spool 4. The drag adjuster 40 is attached to the distal end of the spool shaft 8 and adjusts the frictional coupling force of the spool braking unit 62. The seal member 50 is elastically deformable. The seal member 50 protrudes from the drag adjuster 40 side toward the front flange 25 so as to close a space that is formed between the front flange 25 and the drag adjuster 40. The seal member 50 can abut the front flange 25 that is provided to the front side of the line winding cylinder part 22a.

In the present spinning reel 100, the space that is formed between the front flange 25 and the drag adjuster 40 is closed with the seal member 50 abutting the front flange 25. Accordingly, in the present spinning reel 100, the seal member 50 abuts the front flange 25; therefore, it is not necessary to form a space for disposing the entire seal member 50 inside of the line winding cylinder part 22a of the spool 4. Therefore, when compared to conventional technology, the outer diameter of the line winding cylinder part 22a of the spool 4 can be small, and sufficient fishing line can be wound to the spool 4. That is, a spinning reel is provided that can sufficiently wind fishing line to the spool 4.

(B) In the present spinning reel 100, the front flange 25 disposed on the front side of the line winding cylinder part 22a comprises a flange portion 27 that extends in a direction away from the spool shaft 8 and a connecting portion 28 that connects the line winding cylinder part 22a and the flange portion 27. At least either the flange portion 27 or the connecting portion 28 comprises a projection 29. The distal end portion of the seal member 50 can abut the projection 29.

In this configuration, since the distal end portion of the seal member 50 can abut the projection 29 of at least one of the flange portion 27 and the connecting portion 28, the intrusion of foreign matter inside of the spool 4 can be reliably prevented.

(C) In the present spinning reel 100, the projection 29 protrudes forward from at least one of the flange portion 27 and the connecting portion 28.

In this configuration, since the distal end portion of the seal member 50 can abut a projection 29 that protrudes forward from at least one of the flange portion 27 and the connecting portion 28, the intrusion of foreign matter along the flange portion and/or the connecting portion can be reliably prevented.

(D) In the present spinning reel 100, the distal end portion of the projection 29 is bent toward the spool shaft 8.

In this configuration, the distal end portion of the seal member 50 can be disposed between the part where the distal end portion of the projection 29 is bent and at least one of the flange portion 27 and the connecting portion 28, so that the distal end portion of the seal member can be covered by the projection. Accordingly, the distal end portion of the seal member can be protected, and the intrusion of foreign matter along the flange portion and/or the connecting portion can be more prevented.

(E) In the present spinning reel 100, the distal end side rear surface of the seal member 50 can abut the front flange 25 that is disposed on the front side of the line winding cylinder part 22a.

In this configuration, the distal end side rear surface of the seal member 50 can be in surface contact with the front flange 25. Thus, the intrusion of foreign matter can be reliably prevented with the seal member 50. That is, a spinning reel is provided that can reliably prevent the intrusion of foreign matter inside of the spool 4.

(F) In the present spinning reel 100, the front flange 25 comprises a flange portion 27 and a connecting portion 28. The flange portion 27 is a portion that extends in a direction away from the spool shaft 8. The connecting portion 28 is a portion that connects the line winding cylinder part 22a and the flange portion 27. The connecting portion 28 comprises an abutting plane 28a that can abut the distal end side rear surface of the seal member 50.

In this configuration, the distal end side rear surface of the seal member 50 can be in surface contact with the abutting plane 28a of the connecting portion 28. Thus, the intrusion of foreign matter can be reliably prevented with the seal member 50.

(G) in the present spinning reel 100, the drag adjuster 40 comprises an adjustment knob 41, a nut 43, an abutting member 44, and a fixing member 45. The adjustment knob 41 is screwed to the distal end of the spool shaft 8. The abutting member 44 is disposed on the adjustment knob 41 and can abut the front surface of the seal member 50. The fixing member 45 fixes the abutting member 44 to the adjustment knob.

In his configuration, the intrusion of foreign matter inside of the drag adjuster 40 can be prevented by abutting the abutting member 44 of the drag adjuster 40 to the front surface of the seal member 50.

(H) In the present spinning reel 100, the fixing member 45 comprises a threaded portion 45a and a head portion 45b. The adjustment knob 41 comprises a boss portion 46 to which the threaded portion 45a is screwed. The abutting member 44 comprises a holding portion 44c to which the boss portion 46 is inserted and that is held by the adjustment knob 41 and the head portion 45b.

In this configuration, the boss portion 46 of the adjustment knob 41 is inserted into the holding portion 44c of the abutting member 44. In this state, the holding portion 44c of the abutting member 44 is held by the adjustment knob 41 and the head portion 45b. Accordingly, since the threaded portion 45a of the fixing member 45 can be screwed into the boss portion 46 of the adjustment knob 41 on the head portion 45b side, the boss portion 46 of the adjustment knob 41 can be short. That is, it is possible to reduce the size of the drag adjuster 40, and the seal member 50 can abut at least one of the front flange 25 and the connecting portion 28.

In the present spinning reel 100, the boss portion 46 comprises a boss body section 46a and a large-diameter section 46b that is disposed on the outer periphery of the boss body section 46a. The holding portion 44c is held by the head portion 45b and the large-diameter section 46b.

In this configuration, the holding portion 44c of the abutting member 44 is held by the head portion 45b of the fixing member 45 and the large-diameter section 46b of the boss portion 46 of the adjustment knob 41, so that the abutting member 44 can be securely fixed to the adjustment knob 41 by the fixing member 45.

Second Embodiment

In the spinning reel according to the second embodiment, the way in which the seal member 50 abuts the spool 4 differs from the first embodiment. Therefore, the configuration of the seal member 50 and the configuration of the spool 4 will be explained regarding the parts that are different form the first embodiment; the explanations regarding the configurations that are the same as those in the first embodiment will be simplified or have been omitted. Additionally, the explanations regarding the configurations besides the seal member 50 and the spool 4 have been omitted. The explanations of the configurations also omitted here shall be pursuant to the configurations of the first embodiment. Moreover, in FIG. 4, the configurations that are the same as those in the first embodiment have been given the same numbers.

Figure 4:
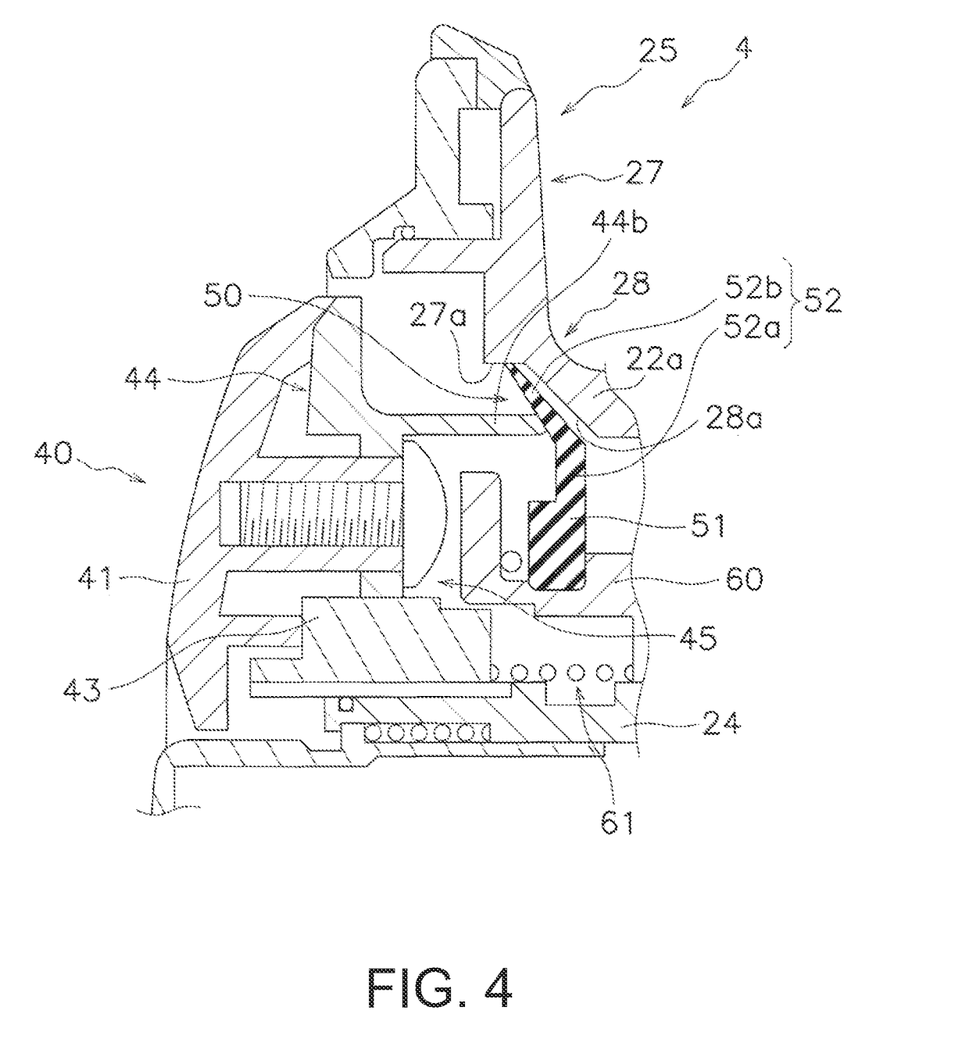
FIG. 4 is a partial enlarged cross-sectional view of a spinning reel according to a second embodiment of the present invention.

As shown in FIG. 4, the spool 4 comprises a spool body 22 and a spool tube part 24. The spool tube part 24 is configured in the same way as in the first embodiment, so the explanation thereof has been omitted here.

The spool body 22 comprises a line winding cylinder part 22a, a front flange 25 (one example of a flange), a rear flange 32b (refer to FIG. 1), and a tubular portion 42b (refer to FIG. 1). The front flange 25 comprises a flange portion 27 and a connecting portion 28. The inner peripheral part of the flange portion 27 comprises a first abutting plane 27a that the seal member 50 abuts. The connecting portion 28 comprises a second abutting plane 28a (one example of an abutting plane). The second abutting plane 28a abuts the distal end side rear surface of the seal member 50. The second abutting plane 28a is formed along the inner peripheral surface of the connecting portion 28 in the circumferential direction. Additionally, the second abutting plane 28a is inclined from the front surface of the flange portion 27 toward the inner peripheral surface of the line winding cylinder part 22a. Further, the rear flange 32b and the tubular portion 42b are configured in the same way as in the first embodiment, so their explanations have been omitted here.

The seal member 50 is elastically deformable. As shown in FIG. 4, the seal member 50 protrudes from the drag adjuster 40 side toward the spool 4 side so as to close a space that is formed between the spool 4 and the drag adjuster 40. The seal member 50 can abut the front flange 25. Specifically, the seal member 50 abuts the flange portion 27 of the front flange 25.

The seal member 50 is mounted to the spool tube part 24. Specifically, the seal member 50 is mounted to the spool tube part 24 via the pressing member 60 of the drag mechanism 30. That is, the seal member 50 is mounted to the spool shaft 8 via the pressing member 60 and the spool tube part 24.

The seal member 50 comprises a mounting portion 51 and a seal portion 52 that extends outward from the mounting portion 51. The mounting portion 51 is formed in a cylindrical shape, and the inner peripheral part of the mounting portion 51 is mounted to the outer peripheral part of the pressing member 60. The seal portion 52 is integrally formed on the outer peripheral part of the mounting portion 51. The seal portion 52 is formed in an essentially annular plate shape. The distal end portion of the seal member 50 and the distal end side rear surface of the seal member 50 abut the front flange 25.

Specifically, the seal member 52 comprises a proximal end portion 52a and an inclined portion 52b. The proximal end portion 52a is a portion that extends radially outward from the mounting portion 51. The inclined portion 52b is a portion that extends while inclining forward from the proximal end portion 52a. In one embodiment, the distal end of the inclined portion 52b abuts the first abutting plane 27a of the flange portion 27 of the front flange 25. Additionally, the rear surface of the inclined portion 52b can abut a second abutting plane 28a of the connecting portion 28 of the front flange 25. For example, when the drag adjuster 40 is operated and the drag adjuster 40 approaches the spool 4, the rear surface of the inclined portion 52b can abut the second abutting plane 28a of the connecting portion 28 of the front flange 25. However, when the drag adjuster 40 is disposed in a state in which the above-described gap is formed, and an external force acts on the front surface of the inclined portion 52b, the inclined portion 52b is elastically deformed toward the front flange 25 and is able to abut the second abutting plane 28a of the connecting portion 28 of the front flange 25. Accordingly, the intrusion of foreign matter inside of the line winding cylinder part 22a can be reliably prevented. Moreover, the front surface of the inclined portion 52b of the seal member abuts the abutting member 44 (the abutting portion 44b) of the drag adjuster 40 in the same way as in the first embodiment; therefore, the intrusion of foreign matter inside of the drag adjuster 40 is also prevented.

Other Embodiments (A) In the above-described first embodiment, an example is explained in which the bent portion 29a is formed in the projection 29 of the front flange 25; however, as long as the seal member 50 (the distal end of the inclined portion 52b) can abut the projection 29, the bent portion 29a does not necessarily have to be formed in the projection 29.

(B) In the above-described first embodiment, an example is explained in which the projection 29 is formed in the flange portion 27; however, the projection 29 can be formed in any way as long as this projection is formed in the front flange 25. For example, the projection 29 can be formed in the connecting portion 28. The projection 29 can also be formed to straddle the flange portion 27 and the connecting portion 28.

(C) In the above-described second embodiment, an example is explained in which the flange portion 27 is thick, and the seal member 50 (the distal end of the inclined portion 52b) abuts the flange portion 27. Instead of the above, the outer peripheral side of the connecting portion 28 can be partially thick, and a first abutting plane 27a, as shown in FIG. 4, can be formed. Additionally, the first abutting plane 27a can be formed to straddle the flange portion 27 and the connecting portion 28.

(D) in the first and the second embodiments, a lever brake-type spinning reel is used as an example for the explanation; however, the spinning reel can also be a non-lever brake-type reel.

The present invention can be widely applied to a spinning reel.

What is claimed is:

1. A spinning reel for forwardly casting a fishing line, comprising:
   a reel body unit;
   a spool shaft having a distal end and being supported by the reel body unit so as to be movable longitudinally;
   a spool including a line winding cylinder part having a front side, and a front flange disposed on the front side of the line winding cylinder part and being attached to the spool shaft, the line winding cylinder part being configured to have the fishing line wound to an outside thereof, the front flange comprising a flange portion and a connecting portion, and at least one of the flange portion and the connecting portion comprising a projection, a distal end portion of the projection being bent toward the spool shaft;
   a drag mechanism comprising a braking member housed inside of the spool and being configured to brake a rotation of the spool, and a drag adjuster attached to the distal end of the spool shaft and being configured to adjust a frictional coupling force of the braking member; and
   a seal member having a drag adjuster side and being configured to be elastically deformed, the seal member protruding from the drag adjuster side toward the front flange so as to seal a space formed between the front flange and the drag adjuster, and being configured to abut the front flange.

2. The spinning reel recited in claim 1, wherein
the flange portion extends in a radial direction away from the spool shaft and the connecting portion connects the line winding cylinder part and the flange portion, and
a distal end portion of the seal member is configured to abut the projection.

3. The spinning reel recited in claim 2, wherein
the projection protrudes forward from the at least one of the flange portion and the connecting portion.

4. The spinning reel recited in claim 1, wherein
a distal end side rear surface of the seal member abuts the front flange.

5. The spinning reel recited in claim 4, wherein
the front flange comprises a flange portion extending in a radial direction away from the spool shaft and a connecting portion connecting the line winding cylinder part and the flange portion, and
the connecting portion comprises an abutting plane abutting the distal end side rear surface of the seal member.

6. The spinning reel recited in claim 1, wherein
the drag adjuster comprises an adjustment knob screwed into a distal end of the spool shaft, an abutting member disposed in the adjustment knob and being configured to abut a front surface of the seal member, and a fixing member fixing the abutting member to the adjustment knob.

7. The spinning reel recited in claim 6, wherein
the fixing member comprises a threaded portion and a head portion,
the adjustment knob comprises a boss portion to which the threaded portion is screwed, and
the abutting member comprises a holding portion into which the boss portion is inserted and that is held by the adjustment knob and the head portion.

8. The spinning reel recited in claim 7, wherein
the boss portion comprises a body section and a large-diameter section disposed on an outer periphery of the body section, and
the holding portion is held by the head portion and the large-diameter section.

* * * * *